(12) United States Patent
Wieres et al.

(10) Patent No.: US 8,460,612 B2
(45) Date of Patent: Jun. 11, 2013

(54) HONEYCOMB BODY WITH STRUCTURED SHEET METAL MATERIAL AND PARTICLE SEPARATOR, CATALYST CARRIER BODY AND MOTOR VEHICLE HAVING THE HONEYCOMB BODY

(75) Inventors: Ludwig Wieres, Overath (DE); Stefan Seeliger, Alterstedt (DE)

(73) Assignee: EMITEC Gesellschaft fuer Emissionstechnologie mgH, Lohmar (DE)

( * ) Notice: Subject to any disclaimer, the term of this patent is extended or adjusted under 35 U.S.C. 154(b) by 350 days.

(21) Appl. No.: 12/833,316

(22) Filed: Jul. 9, 2010

(65) Prior Publication Data
US 2010/0331180 A1 Dec. 30, 2010

Related U.S. Application Data

(63) Continuation of application No. PCT/EP2008/068142, filed on Dec. 22, 2008.

(30) Foreign Application Priority Data

Jan. 9, 2008 (DE) .......................... 10 2008 003 658

(51) Int. Cl.
*B01D 50/00* (2006.01)
(52) U.S. Cl.
USPC .......................................... 422/180; 422/177
(58) Field of Classification Search
USPC ...................... 422/177, 180; 428/593; 55/525, 55/523
See application file for complete search history.

(56) References Cited

U.S. PATENT DOCUMENTS

| 5,518,697 | A | 5/1996 | Dalla Betta et al. |
| 6,712,884 | B2 | 3/2004 | Brück et al. |
| 7,276,295 | B2 | 10/2007 | Mangold et al. |
| 7,563,414 | B2 | 7/2009 | Brück |
| 7,709,076 | B2 | 5/2010 | Maus et al. |
| 2005/0054526 | A1 | 3/2005 | Steinke et al. |
| 2005/0274012 | A1 | 12/2005 | Hodgson et al. |
| 2007/0207336 | A1 | 9/2007 | Bruck et al. |
| 2007/0289276 | A1 * | 12/2007 | Hirth et al. ....................... 55/527 |

FOREIGN PATENT DOCUMENTS

| DE | 4234931 A1 | 4/1994 |
| DE | 4437986 A1 | 4/1996 |
| DE | 69526492 T2 | 8/2002 |
| DE | 102004045106 A1 | 3/2006 |
| EP | 1329602 A2 | 7/2003 |
| JP | 63296844 A | 12/1988 |
| JP | 5033636 A | 2/1993 |
| JP | 11128683 A | 5/1999 |

(Continued)

OTHER PUBLICATIONS

International Search Report dated Apr. 20, 2009.

*Primary Examiner* — Tom Duong
(74) *Attorney, Agent, or Firm* — Laurence A. Greenberg; Werner H. Stemer; Ralph E. Locher

(57) ABSTRACT

A honeycomb body includes at least one housing and a honeycomb structure for a waste-gas purification system having at least one sheet metal material. The sheet metal material has elevations in at least one section and an edge contour enclosing the elevations. A portion of the area of the elevations in the at least one section is at least 80%. A particle separator, a catalyst carrier body and a motor vehicle having the honeycomb body are also provided.

10 Claims, 2 Drawing Sheets

FOREIGN PATENT DOCUMENTS

| | | |
|---|---|---|
| KR | 20050084183 A | 8/2005 |
| WO | 0200326 A2 | 1/2002 |
| WO | 2004050219 A1 | 6/2004 |
| WO | 2004072446 A1 | 8/2004 |
| WO | 2005068798 A1 | 7/2005 |
| WO | 2006114345 A1 | 11/2006 |

* cited by examiner

HONEYCOMB BODY WITH STRUCTURED SHEET METAL MATERIAL AND PARTICLE SEPARATOR, CATALYST CARRIER BODY AND MOTOR VEHICLE HAVING THE HONEYCOMB BODY

CROSS-REFERENCE TO RELATED APPLICATION

This is a continuation, under 35 U.S.C. §120, of copending International Application No. PCT/EP2008/068142, filed Dec. 22, 2008, which designated the United States; this application also claims the priority, under 35 U.S.C. §119, of German Patent Application DE 10 2008 003 658.7, filed Jan. 9, 2008; the prior applications are herewith incorporated by reference in their entirety.

BACKGROUND OF THE INVENTION

Field of the Invention

The present invention relates to a honeycomb body including at least one housing and a honeycomb structure for an exhaust-gas purification system having at least one sheet metal material, in which one portion of the sheet metal material has elevations and an edge contour which surrounds the elevations. The present invention also relates to the use of such honeycomb bodies in the automotive field.

The prior art discloses a multiplicity of differently constructed metallic exhaust-gas purification components which propose a variety of different metallic materials and/or shapes for their individual components. In that case, sheet metal materials are used, for example, as a constituent part of a housing, as a sleeve, as an intermediate layer or else for producing the honeycomb structure from thin sheet metal foils in smooth or structured form.

It is known to provide channels, furrows or the like on the inside of the region of the housing, which are intended to manipulate a brazing material or agent flow between the housing and the honeycomb structure. It is also known to provide guide blades and/or microstructures for the foils which are proposed for constructing the honeycomb structure, which generate local flow manipulation (for example deflection) of the exhaust gas in the channel interior.

Despite the existing variety in this technical field, it has not yet been possible to meet all the demands with regard to a stable honeycomb body which is of expedient construction with regard to flow and which can be produced in a cost-effective and material-saving manner. In this respect, there is a further demand for improvements in this case.

SUMMARY OF THE INVENTION

It is accordingly an object of the invention to provide a honeycomb body with a structured sheet metal material and a particle separator, a catalyst carrier body and a motor vehicle having the honeycomb body, which overcome the hereinafore-mentioned disadvantages and at least partially alleviate the problems highlighted with regard to the heretofore-known devices of this general type and which in particular provide a honeycomb body that can have a lighter and more compact construction through the use of a special sheet metal material, with high exhaust-gas purification efficiency simultaneously being ensured and cost-effective production of the honeycomb body being made possible.

With the foregoing and other objects in view there is provided, in accordance with the invention, a honeycomb body, comprising at least one housing and a honeycomb structure, for an exhaust-gas purification system, in the at least one housing. The honeycomb structure has at least one sheet metal material including at least one portion having elevations and an edge contour surrounding the elevations with an area percentage of the elevations in the at least one portion of at least 80%.

In this case, the term "honeycomb body" means, in particular, a monolithic honeycomb body which can be traversed by fluid in a preferred flow direction and which has an inflow-side end side and an outflow-side end side spaced apart therefrom, with the honeycomb body being composed, for example, of at least partially structured metal sheets which are disposed in layers and which form channels that run (approximately) in the flow direction and have a dimension determined by a corrugation of a part of the metal sheets. In this case, the honeycomb body includes substantially only metallic components, that is to say the housing and honeycomb structure are formed by metal sheets. Within the context of this invention, however, use may also be made of honeycomb bodies composed at least partially of ceramic materials, which are used to construct the honeycomb structure.

In this case, the housing generally forms the outer circumferential surface of the honeycomb body and holds within it at least one honeycomb structure, so as to form a honeycomb structure through which a fluid can flow. The sheet metal material disposed in the honeycomb body is distinguished, in at least one portion of its surface, by elevations which are surrounded in each case by an edge contour. An elevation is (in cross section) in particular a hump, a hill, a bulge or the like, with preferably a (locally delimited) maximum of the elevation being present in a central region of the elevation (with a uniform spacing from all the edge contours). That is to say, in particular, no large-area plateau is formed. It is very particularly preferable for all the elevations in the portion to be identical with regard to their area, height and shape. This furthermore also means that the elevations are enclosed by the edge contour, or that the elevations are disposed at the inside in relation to the edge contour. In this case, the elevations may have any desired circumferential or edge contours, and in particular may be triangular, square, pentagonal, otherwise also polygonal, or else round, oval or of similar construction. The edge contours therefore form a closed circumference for each elevation and form a type of (linear) boundary between (directly) adjacent elevations.

Within the portion, the elevations are preferably disposed so as to be separated only by the edge contour itself and so as to be adjacent one another, in such a way that in particular for example a periodic, regular repeating structure is formed by the edge contour and the elevations. In this case, depending on the shape of the elevation, each individual elevation is adjacent at least one, two or even more elevations. It is thus possible, for example in the case of an octagonal construction of the elevations, for up to eight further elevations to be disposed in the direct vicinity of the first elevation, separated only by the edge contour surrounding the elevation in question.

In this case, the areas of the elevations measured in relation to the total area of the portion in which the elevations and the edge contours are disposed have an area percentage of the total area of the portion of up to 80%. The area percentage of the elevation in relation to the total area of the portion is in particular greater than 85%, preferably greater than 90% and particularly preferably greater than 95% of the total area of the portion. It is therefore clear that by far the predominant percentage of the area of the portion (which extends preferably over the entire surface of the sheet metal material) is formed by the elevations, that is to say the edge contour is formed only of strip-shaped or linear construction.

The effect of this configuration of elevations and edge contours on the sheet metal material is, for example, a stiffening of the sheet metal material in relation to other structured or else smooth sheet metal materials which are otherwise used for the honeycomb body. The three-dimensional structure of the sheet metal material in the form of elevations and edge contours results in an extremely bending-resistant and dimensionally stable structure, and therefore allows the sheet metal material to be formed with a comparatively small material thickness. This simultaneously has the result, for a honeycomb body when using this sheet metal material, of favorable acoustic properties during use in the exhaust system, in particular because damping of low resonance takes place. In particular, through the use of a sheet metal material structured in this way, frequencies of the exhaust system in a range of up to 500 Hertz and lower are damped. Furthermore, the sheet metal material results in high thermal stability of the honeycomb body, in particular because stresses from the thermal expansion can be compensated by the three-dimensional structure of the sheet metal material.

The sheet metal material with elevations and surrounding edge contours preferably only has linear and/or punctiform points of contact with other components or sheet metal foils of the honeycomb body according to the invention. On that side of the sheet metal material on which the edge contours form those points of the sheet metal material which protrude furthest from the sheet metal plane, the contact points in this case are preferably linear, while on that side of the sheet metal material on which the elevations protrude furthest from the sheet metal plane, the contact points are preferably punctiform. In particular, there are preferably no areal contact points of the sheet metal foil with other components or sheet metal foils of the honeycomb body according to the invention.

In accordance with another advantageous feature of the honeycomb body of the invention, a uniform degree of deformation of the sheet metal material is present in the portion which has the elevations and the edge contours surrounding the elevations. In this case, a "uniform degree of deformation" means in particular that, despite the deformation of an originally smooth metal sheet to form a sheet metal material with elevations and edge contours, the same wall thicknesses are present at all points of the sheet metal material. This special feature of the sheet metal material leads to a further increase in the bending resistance and dimensional stability with a simultaneously reduced material thickness, because the material has no material weakenings at any point within the portion. At the same time, the sheet metal material which is formed in this way has large plasticizing reserves for further deformations, for example for the deformation to form a corrugated layer or other structurings of the sheet metal material.

The deformation of the sheet metal material in one portion to form elevations and edge contours is produced in this case according to a special method in which the sheet metal material is supported in the region of the edge contour by a tool and is loaded by a pressure medium from the outside, in such a way that the elevations are formed in the sheet metal material in relation to the edge contours. As a result of the uniform pressurization by the pressure medium, a uniform flow of the sheet metal material is obtained in such a way that the same material thicknesses can be obtained both in the region of the edge contour and also in the region of the elevations. In this case, the supporting tool has substantially the structure of the edge contours which extend around the elevations.

In accordance with a further special feature of the honeycomb body of the invention, the sheet-metal material is a structured foil for constructing the honeycomb structure of the honeycomb body. This means, in particular, that the sheet metal material can be disposed in a layered fashion in order to generate channels which run in the flow direction of a fluid. In this case, the sheet metal material is used in particular to manipulate the flow behavior of the exhaust gas through the honeycomb structure.

As a result of the special structuring of the sheet metal material with elevations and edge contours, the heat and mass transfer within the honeycomb structure can also be improved as a result of a self-induced flow distribution (turbulent flow) of the fluid flow. Specifically, by combining the sheet metal material with, for example, smooth sheet metal foils, different flow speeds are generated within the respective channels, and therefore a turbulent component is obtained in the through-flowing fluid. The turbulent component contributes to the conversion of a laminar throughflow into a turbulent throughflow and therefore assists the mass transport within a channel.

Furthermore, an improved compensation of the thermal expansion of the material is obtained as a result of the improved shaping of the sheet metal material. In particular, as a result of the three-dimensional structure with elevations having a large area percentage, the sheet metal material expands less than other known sheet metal foils, in such a way that occurring thermal stresses between the edge region and core region of a honeycomb structure are reduced and therefore the durability of the honeycomb body with regard to mechanical failure is optimized.

Furthermore, the use of the sheet metal material leads to favorable acoustic properties of the metal matrix and to improved resonance behavior, since as a result of the special structuring with elevations and edge contours surrounding the elevations, the vibration and damping behavior is considerably better than that of comparable metallic honeycomb structures with conventional sheet metal materials.

In particular, the sheet metal material with small material thickness has a resulting significantly higher strength than, in particular, smooth metal layers. The strength may be up to 30% greater than the strength of smooth or structured metal foils.

Furthermore, as a result of the particularly gentle deformation of the sheet metal material, which correspondingly has a uniform degree of deformation in the region of the elevations and edge contours, microscopic damage to the sheet metal material (for example as a result of hairline cracks, etc.) can be eliminated.

As a result of the highly uniform deformation of the sheet metal material (having the same material thickness after deformation), it is also made possible to substantially prevent damage to any present surface structures or coatings, because the material can be deformed homogeneously at all points within the portion which is deformed to form elevations and edge contours.

Furthermore, the deformation, which has taken place substantially without material weakening, results in particular in high plasticizing reserves for subsequent deformation steps.

In accordance with an added feature of the honeycomb body of the invention, at least one first wall of at least one channel of the honeycomb structure of the honeycomb body is formed at least partially by the structured foil, and furthermore at least one second wall of the channel is formed at least partially by an element selected from the group including a corrugated layer, a smooth layer and a nonwoven.

The result of such a configuration of at least some channels of a honeycomb structure of a honeycomb body is that different flow speeds of a throughflowing fluid are generated in the vicinity of the walls of the channels. In this case, the speed is increased in the region of the sheet metal material which has elevations and edge contours, in such a way that in particular in the case of an opposite smooth channel wall a "wave-like" cross-turbulence of the exhaust gas is generated and therefore permanent mixing of the fluid flow is obtained. This, in particular, improves the mass transport by increasing the pollutant and concentration gradient between the channel and channel wall.

It is possible, in particular, for the sheet metal material and/or also the (in particular metallic) element specified herein to have a coating which is, in particular, catalytically active and which is suitable for converting pollutants in the exhaust-gas flow.

In accordance with an additional advantageous feature of the honeycomb body of the invention, the structured foil and/or the element have/has openings and are/is free from fittings or equipment. Openings (holes, pores etc., but preferably with a cross section of at least one square millimeter or even square centimeter) within the structured foil or within the element also promote the mixing of the fluid flow through the individual channels. In particular, it is thus possible to obtain a homogeneous distribution of the fluid flow or pollutant distribution within the honeycomb body. Likewise, it is possible to dispense with fittings, such as for example guide blades or the like, which project into the channel. A turbulent flow is thereby obtained without a significant pressure drop occurring across the channel. The use of the sheet metal material as a structured foil for constructing the honeycomb structure therefore eliminates the need to use additional fittings which would be suitable for generating turbulence, mixing, deflection, etc. of the fluid flow.

In accordance with yet another advantageous feature of the invention, the honeycomb body is preferably constructed in such a way that the structured foil has a sheet metal thickness and the elevations have a height measured from the edge contour of the structured foil, in which the height corresponds to at most 6 times, preferably at most 4 times and particularly preferably at most 3 times, the sheet metal thickness. When using the sheet metal material as the structured foil, use is made herein in particular of sheet metal thicknesses lying in the range from 30 µm to 120 µm, in particular in a range from 60 to 80 µm. Limiting the height of the elevations is intended, in particular, to ensure a gentle deformation process and to generate the effects described herein (such as the turbulent flow without a large pressure loss).

In accordance with yet a further special feature of the honeycomb body of the invention, the sheet metal material forms a housing of the honeycomb body. In particular, when used as a housing, the special construction of the sheet metal material through the use of elevations and edge contours results in high dimensional stability which may be up to 30% higher than that of comparable housings. As a result of the increased dimensional stability, the required material usage for the housing can be reduced further.

In addition to the advantages described with regard to the use of the sheet-metal material as a structured foil, specifically in the case of use as a housing, there is a resulting expedient acoustic influencing of the exhaust-gas purification components. Specifically in this case, damping of low resonance in the range from 0 to 500 Hertz occurs. In this case, the structuring of the sheet metal material in one portion is constructed in such a way that, in one axial region of the housing, it extends over the entire circumference and is disposed periodically in the circumferential direction.

In this case, "disposed periodically" means in particular that the structure composed of elevations and edge contours of the sheet metal material is disposed continuously without interruptions or breaks in the circumferential direction, in such a way that there are no non-periodical structures in the circumferential direction.

In particular, the housing has, at one or at both end sides, a surface which is smooth in the circumferential direction so as to enable as simple a connection as possible to further exhaust-gas purification components with corresponding flanges, for example exhaust lines.

The elevations of the sheet metal material are preferably directed into the interior of the housing, in such a way that an intermediate layer or a honeycomb structure or other device can be connected to the housing in the regions of the extrema of the elevations. Furthermore, a honeycomb structure, if appropriate with its own housing, may be disposed in a relatively small cross section of the housing according to the invention, in such a way that a cavity is formed between the housing composed of the sheet metal material according to the invention and the honeycomb structure. In the case of inwardly directed bulges of the sheet metal material according to the invention as a housing, in particular punctiform contact points are formed with the metal foils or layers which form the channel structure of the honeycomb body. If the elevations of the sheet metal material as a housing are directed outward, there are preferably linear contact points with the metal foils or layers which form the channel structure of the honeycomb body.

In accordance with yet an added advantageous feature of the honeycomb body of the invention, the housing has a sheet metal thickness and the elevations have a height measured from the edge contour, in which the height corresponds to at most 4 times, preferably at most 3 times and particularly preferably at most 2 times, the sheet metal thickness. In this case, the sheet metal thickness lies considerably above that of the structured foil, for example in a range from 0.6 to 2.0 mm (millimeters), in particular in a range from 0.8 to 1.5 mm.

With the objects of the invention in view, there is also provided a particle separator or a catalyst carrier body for exhaust-gas aftertreatment of internal combustion engines. The particle separator or catalyst carrier body comprises a honeycomb body according to the invention for exhaust-gas aftertreatment of internal combustion engines. In this case, the honeycomb body may likewise be used as a coated particle separator.

With the objects of the invention in view, there is concomitantly provided a motor vehicle which has a honeycomb body according to the invention.

Other features which are considered as characteristic for the invention are set forth in the appended claims. It should be pointed out that the features specified individually in the dependent claims may be combined with one another in any desired technologically meaningful way and define further embodiments of the invention. Furthermore, the features specified in the claims are rendered in more detail and explained in the description, with further preferred embodiments being presented.

Although the invention is illustrated and described herein as embodied in a honeycomb body with a structured sheet metal material and a particle separator, a catalyst carrier body and a motor vehicle having the honeycomb body, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
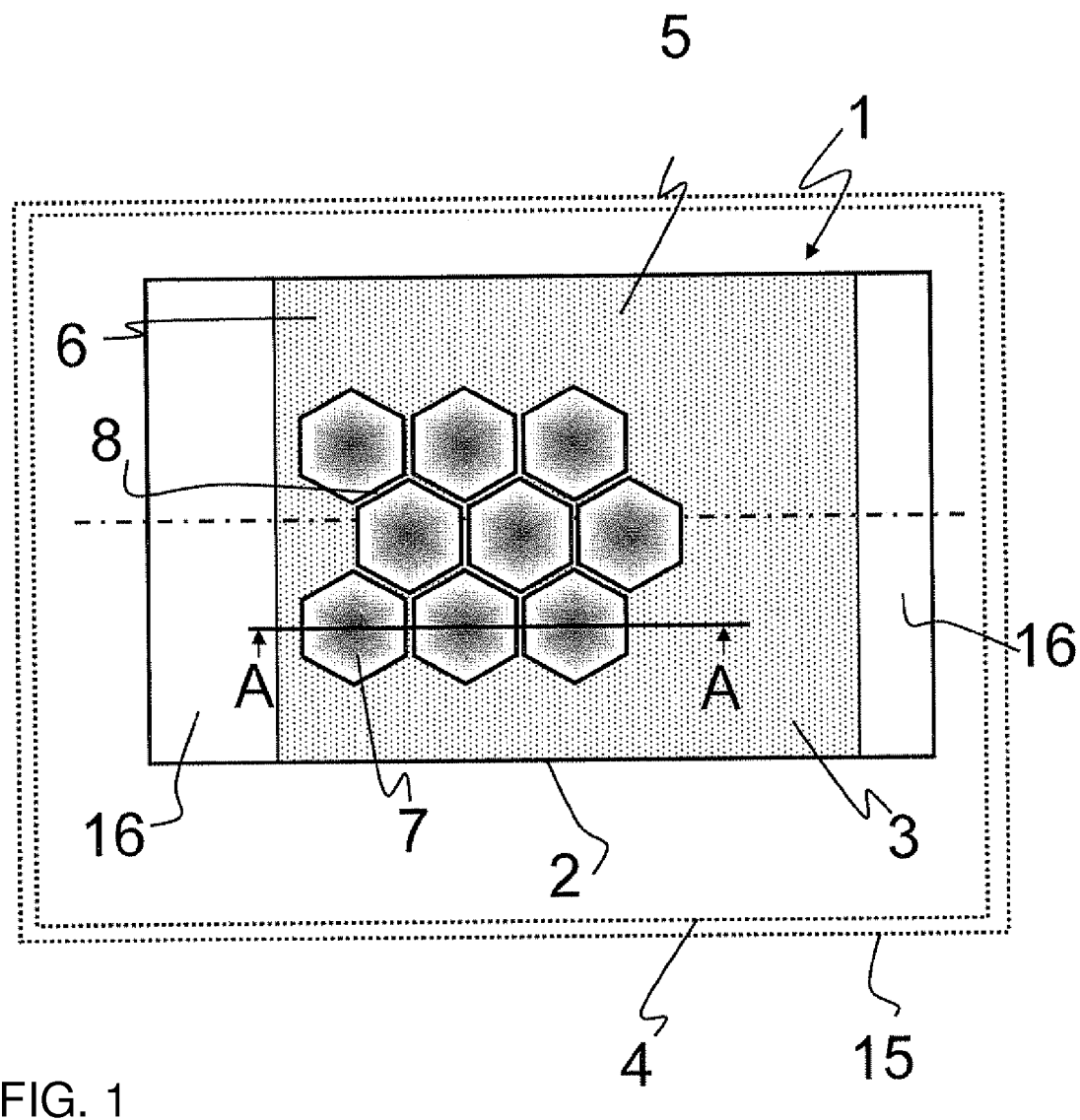
FIG. 1 is a diagrammatic, cross-sectional view of a motor vehicle including an exhaust-gas purification system having a honeycomb body with a housing having sheet-metal material according to the invention.

Referring now in detail to the figures of the drawings, which show particularly preferred embodiment variants of the invention, to which the invention is, however, not restricted and first, particularly, to FIG. 1 thereof, there is seen a diagrammatically illustrated honeycomb body 1 as a component within an exhaust-gas purification system 4 of a diagrammatically illustrated motor vehicle 15. The honeycomb body 1 is formed in this case with a housing 2 and with a diagrammatically illustrated honeycomb structure 3 disposed within the housing 2. In this case, the housing is formed with a sheet metal material 5 which has elevations 7 and a regular edge contour 8 that is only partially illustrated.

In this case, the housing 2 has a portion 6 which runs around in the circumferential direction of the housing 2 and within which the sheet metal material 5 is formed only from the elevations 7 and the edge contours 8. In this case, the edge contours 8 in each case fully circumferentially surround the elevation 7. The portion 6 ends at connecting regions 16 of the housing 2 with a widened edge contour 8. The shape of the elevations 7 and of the edge contours 8, which is selected in this case, is shown by way of example in FIG. 2, which is a cross section taken along a line A-A of FIG. 1. At any rate, the area percentage of the elevations 7 in the portion 6 amounts to at least 80% (which is the total area minus the edge contour).

As mentioned above, FIG. 2 diagrammatically shows the cross section taken along the line A-A of FIG. 1, through the housing 2 of the honeycomb body 1. In this case, the sheet metal material 5 has the elevations 7 and the edge contours 8 within the portion 6, which separate the elevations 7 from one another in each case and simultaneously fully circumferentially surround the elevations 7. The edge contours are formed so as to be substantially flat and in particular planar in relation to the elevations 7 and it is self-evident that the edge contours are adapted to the respective outer shape of the housing 2.

Figure 2:
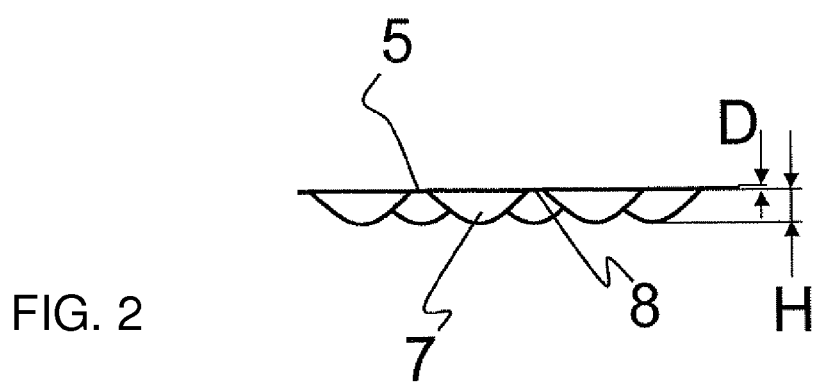
FIG. 2 is a cross-sectional view of the housing of FIG. 1, which is taken along a line A-A of FIG. 1, in the direction of the arrows.

In this case, the sheet metal material 5 has a thickness D and the elevations 7 of the sheet metal material 5 have a height H which is measured from that side of the sheet metal material 5 which faces away from the elevation 7 to the outer sheet metal surface of the sheet metal material 5 of the elevation 7. In FIG. 2, it is clear that, in one particularly advantageous embodiment of the sheet metal material 5, the elevations 7 are disposed offset with respect to one another in the circumferential direction of the housing 2, so as to provide a high bending resistance and dimensional stability of the housing 2.

In the housing 2 according to FIGS. 1 and 2, the elevations 7 and edge contours 8 extend, within the axially delimited section or portion 6, over the entire circumference of the housing 2, with the periodic configuration of the elevations 7 and edge contours 8 being uninterrupted in the circumferential direction.

Figure 3:
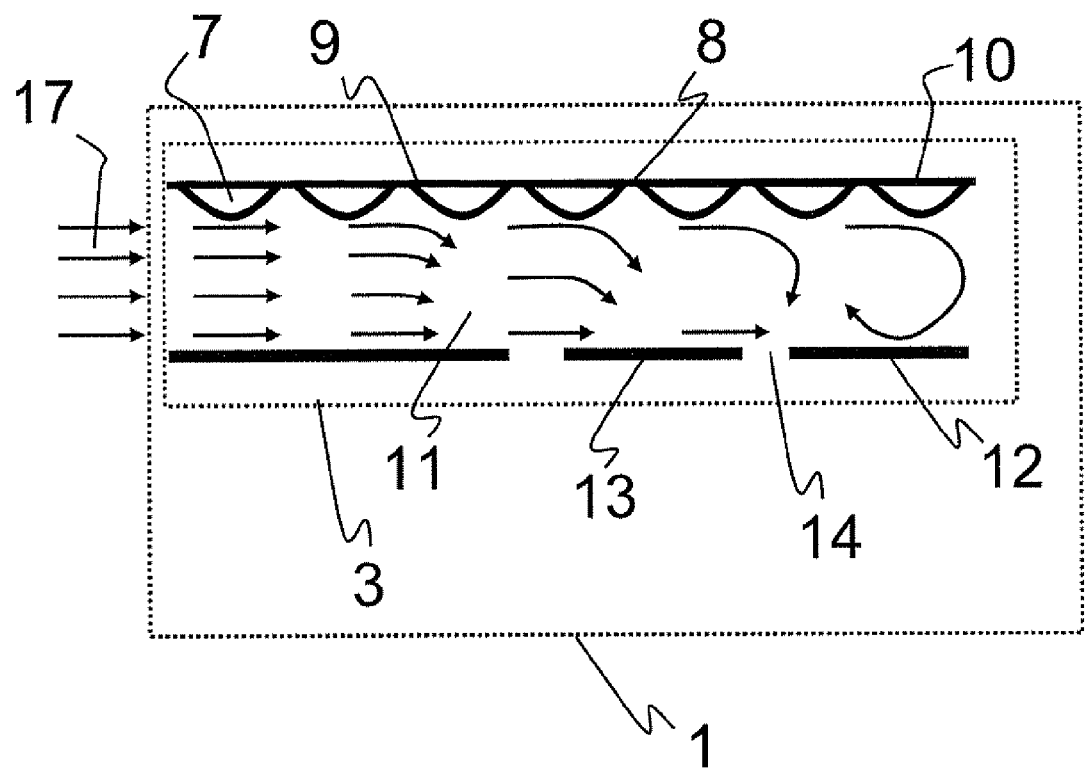
FIG. 3 is a cross-sectional view of a honeycomb structure channel, through which a fluid flows.

FIG. 3 diagrammatically shows a channel 11 of a honeycomb structure 3 within a honeycomb body 1 and an exhaust-gas flow 17 which flows through the channel 11. The channel 11 is formed by different walls and has, on a first wall 10, a structured foil 9 which has elevations 7 and edge contours 8 in at least one partial region of the channel wall. A second wall 12 of the channel 11, which is disposed opposite the first wall 10, is formed by a metallic element 13 which may, for example, be a smooth layer (in the manner of a metal foil), a corrugated layer (in the manner of a metal foil) or else a nonwoven (composed of wire filaments). The second wall 12 is formed, in particular, so as to be smooth or planar or non-structured in relation to the structured foil 9. As a result of this configuration, different flow speeds and flow profiles of the exhaust-gas flow 17 are generated within the channel 11, as indicated by different arrow lengths and arrow directions in FIG. 3. In this case, the exhaust-gas flow 17 accelerates in the region of the first wall 10 of the channel 11 which is formed by the structured foil 9, in such a way that the exhaust-gas flow 17 is deflected in the direction of the second wall 12. The conversion of a laminar throughflow into a turbulent throughflow is assisted by the elevations 7 of the structured foil 9. In this case, in particular, a wave-like turbulent flow of the exhaust-gas flow 17 is generated within the channel 11 and an improvement in the mass transport of the exhaust-gas flow 17 between the channel 11 and the possibly coated channel walls (10, 12) is thereby effected.

In addition, the element 13 is provided with a multiplicity of openings 14 distributed over the length of the channel. The openings 14 enable mixing of the exhaust-gas flow 15 between individual channels 11 which are otherwise separated (if appropriate in terms of flow) by the walls (10, 12). The openings 14 thereby contribute to a homogenization of the exhaust-gas flow 17 over the entire cross section of the honeycomb structure 3.

The present invention is not restricted to the illustrated exemplary embodiments. Numerous modifications of the invention are in fact possible within the scope of the claims.

The invention claimed is:

1. A honeycomb body, comprising:
   at least one housing;
   a honeycomb structure for an exhaust-gas purification system;
   at least one sheet metal material being a structured foil having a surface and forming at least one of said honeycomb structure or said at least one housing, said at least one sheet metal material including at least one portion extending entirely over said surface and having elevations and edge contours surrounding said elevations;
   said elevations in said at least one portion having an area percentage of at least 80%;
   at least one of said at least one sheet metal material or said at least one housing having a sheet metal thickness;
   said elevations having a height measured from said edge contours; and
   said height corresponding to at most six times said sheet metal thickness.

2. The honeycomb body according to claim 1, wherein said at least one portion, having said elevations and said edge contours surrounding said elevations, has a uniform degree of deformation of said sheet metal material.

3. The honeycomb body according to claim 1, wherein said honeycomb structure has at least one channel defined by at least one first wall formed at least partially by said structured foil and at least one second wall formed at least partially by an element selected from the group consisting of a corrugated layer, a smooth layer and a nonwoven.

4. The honeycomb body according to claim 3, wherein at least one of said structured foil or said element has openings and is free of fittings.

5. A particle separator for exhaust-gas treatment of internal combustion engines, the particle separator comprising:
  a honeycomb body according to claim 1 for exhaust-gas treatment of internal combustion engines.

6. A catalyst carrier body for exhaust-gas treatment of internal combustion engines, the catalyst carrier body comprising:
  a honeycomb body according to claim 1 for exhaust-gas treatment of internal combustion engines.

7. A motor vehicle, comprising:
  a honeycomb body according to claim 1.

8. The honeycomb body according to claim 1, wherein said edge contours form a closed embracing for each of said elevations and provide boundaries between adjacent elevations having at least one of a stripe shape or a line shape.

9. The honeycomb body according to claim 1, wherein said edge contours have a shape selected from the group consisting of triangular, quadrangular, pentagonal and polygonal.

10. The honeycomb body according to claim 1, wherein all of said elevations in said at least one portion have the same area, height and shape.

* * * * *